United States Patent Office 3,229,590
Patented Jan. 18, 1966

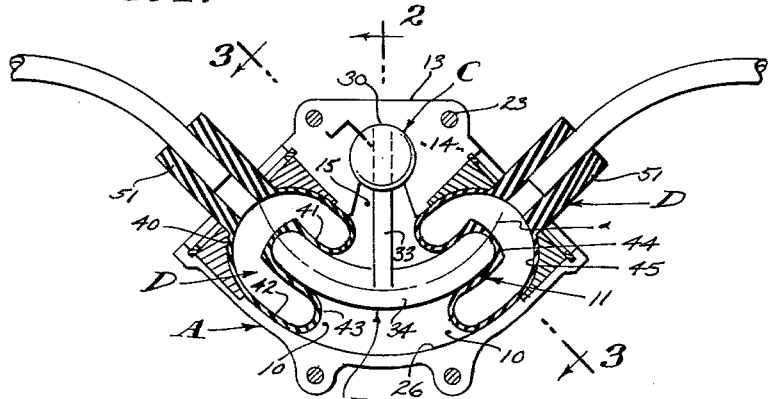
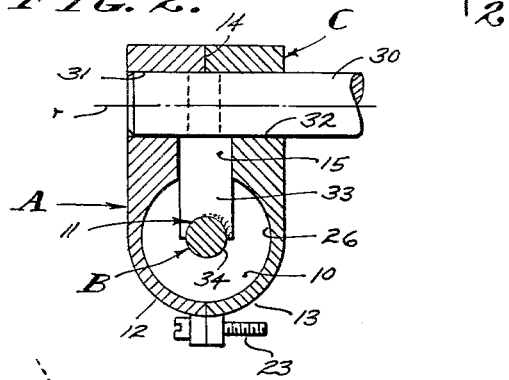
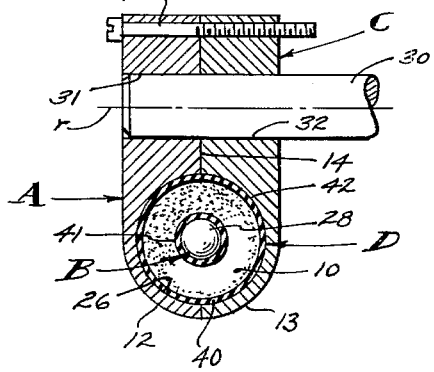
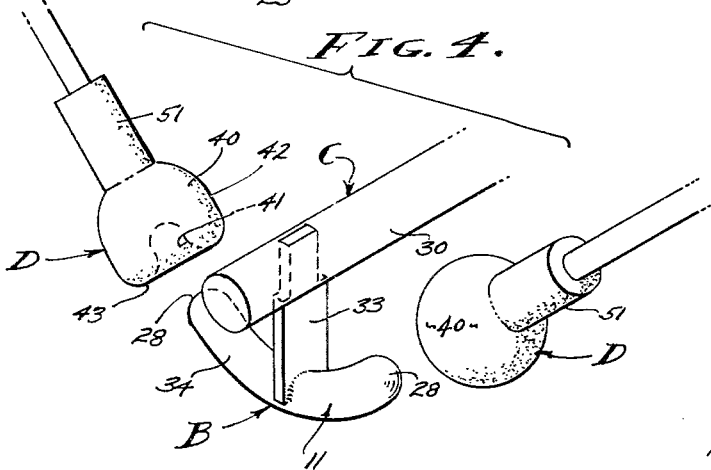

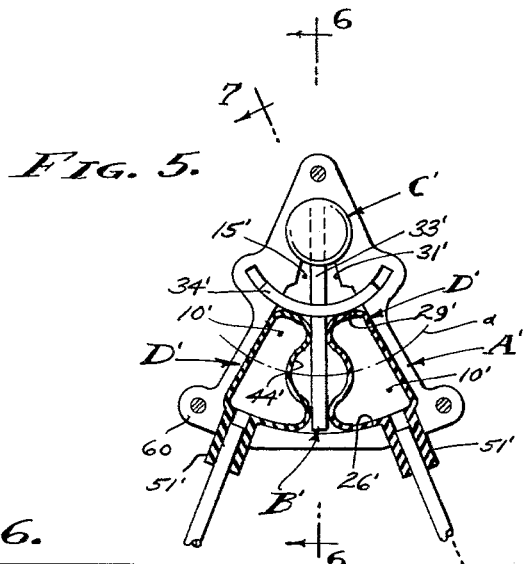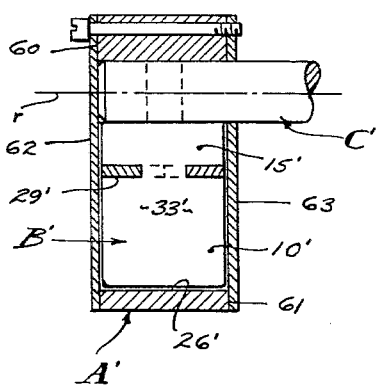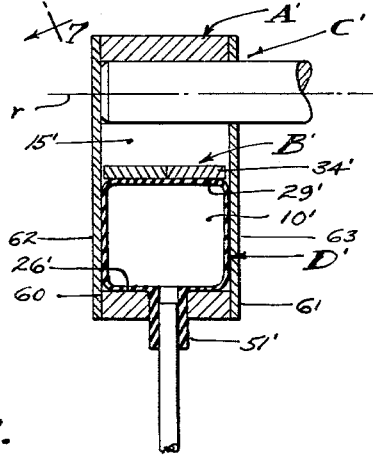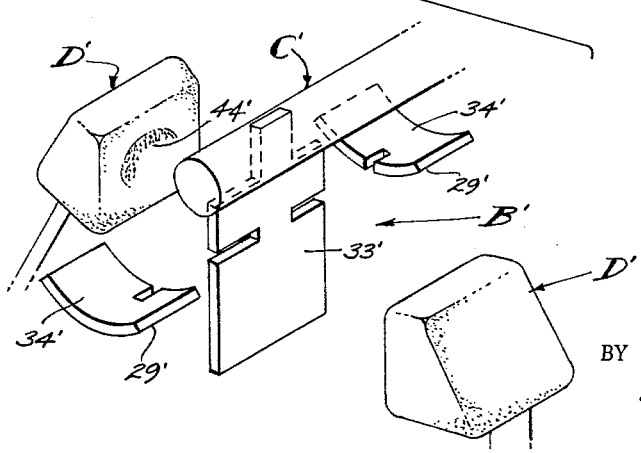
INVENTOR.
PAUL HUSKA

3,229,590
FLUID DISPLACEMENT ACTUATOR
Paul Huska, 1150 18th St., Los Angeles, Calif.
Filed Nov. 18, 1963, Ser. No. 324,519
6 Claims. (Cl. 92—48)

This application is filed as a continuation-in-part of application Serial No. 293,369, filed July 8, 1963, and entitled "Rotary Fluid Displacement Device." The subject matter which is common to said first filed application is that which is disclosed as the first form of the invention in the following specification.

This invention relates to fluid handling devices wherein mechanical motion and fluid displacement are correlated, either as a receiver or as a transmitter sensitive to movement of fluid and thereby acting essentially as a servo or actuator.

Displacement of fluid as it relates to mechanical motion is not such a simple relationship as to be without problems. Uniformity of action is not always possible in devices designed for this purpose, and frictional requirements result in complexity of relatively moving parts with consequent high cost of manufacture. Therefore, it is a general object of this invention to provide a simple, substantially frictionless and reliable servo or actuator that operates uniformly with the movement of fluid.

Usual motors for transposing fluid movement into mechanical motion are rectilinear and are not adapted to the direct generation of torque. Levers and gears may be employed for reaching this objective, but with complexity, friction and inherent mechanical problem factors. Therefore, it is an object of this invention to provide a servo or actuator which directly applies or receives torque, as a linear function resulting from the movement of fluid.

Ordinary devices involving the movement of parts by fluid movement involve sliding or deflecting seal elements, for example pistons and diaphragms, with variations in friction and unreliable function. Therefore, another object of this invention is to provide a unique arrangement of mechanical and fluid handling elements which results in virtual elimination of variations in friction and with reliability and predictable function. Also, with ordinary piston seals and diaphragms leakage is a factor to be considered, and it is therefore a further object of this invention to virtually eliminate leakage problems at or within the device under consideration.

As will be fully described, the present invention is characterized by a gland which receives the fluid movement and transmits mechanical force to a rotary part that is moved thereby in a linear function. Therefore, it is an object to provide a relationship of mechanical and fluid handling elements which inherently operate to produce linear motion in a rotating part, as the result of linear fluid motion.

The various objects and features of this invention will be fully understood from the following detailed description of the typical forms and applications thereof, throughout which description reference is made to the accompanying drawings, in which:

FIGS. 1 through 4 illustrate the first form of the invention, FIG. 1 being a sectional view through the device, FIGS. 2 and 3 being sectional views taken as indicated by lines 2—2 and 3—3 on FIG. 1, and FIG. 4 being an exploded perspective view illustrating the working elements of the device.

FIGS. 5 through 8 illustrate the second form of the invention, FIG. 5 being a sectional view through the device, FIGS. 6 and 7 being sectional views taken as indicated by lines 6—6 and 7—7 on FIG. 5, and FIG. 8 being an exploded perspective view illustrating the working elements of the device.

In sheets 1 and 5 of the drawings, respectively, I have shown two forms of the present invention, each for use as a servo or actuator. In each form there are features which make for a very simple and practical device having predictable functional characteristics. In both forms there are one or more arcuate cylinders or like chambers of segmental form, and a movable element operable along an arcuate axis $a$ of each cylinder or chamber, said movable element being rotatable on an axis $r$ at the radial center of the cylinder or chamber arc axis $a$. Further, in each form a unique gland or seal is provided to operate within the cylinders or chambers whereby said movable part is displaced so as to revolve on said axis $r$.

In FIGS. 1–4 of the drawings I have shown a servo device that involves a chambered body A in which the device is housed and supported, a part B movable in the chamber of body A to be driven or to drive, bearing means C to rotatably support the part B in the body A, and a gland D to operate against the part B in the chamber of body A and to permit free movement of said part. The particular servo shown is double acting and has, therefore, a pair of opposed chambers 10 that cooperate with opposite ends of an arcuate ram rod 11. Various degrees of rotation can be expected of part B on the rotational axis $r$ depending upon the arcuate length of the chambers and ram rod 11 operating therein.

The body A can be fabricated in various ways and is shown as a bipart structure composed of two like half-shells 12 and 13 that separate at a central plane 14 coincidental with the chamber axis $a$. The rotational axis $r$ extends through the body A normal to the plane 14 and through a lateral chamber 15 established within walls of the body. Fastening holes are provided through which mounting studs 23 are secured to also hold the body parts together.

In accordance with the first form of the invention the body A has the chamber 10 formed therein along a segmental arc or axis $a$, the radial center of which occurs at the rotational axis $r$. In the case illustrated where the device is double acting and there are two chambers 10, the said chambers are of cylinder form. As is clearly shown, the cylinders are semitoroidal in form, normally of uniform cross-sectional diameter, closed at opposite ends and opened into the lateral chamber 15. The chamber walls 26 are reasonably smooth, but not necessarily so smooth as is ordinarily required when sliding fits are involved.

The part B is essentially a lever 33 and in the first form shown it has a curved, or arcuate, element 34 that extends between the cylinder chambers 10 to be operated thereby, there being no pistons as such which would ordinarily be employed to actuate a ram. That is, the element 34 per se is the piston part to be displaced by or to displace fluid. As shown, the element 34 is formed to extend concentrically with the mean diameter or axis $a$ and is of an arcuate extent to enter approximately half way into each cylinder chamber 10, the gland D being provided at the end or ends of the element 34 as will be described. The part B and element 34 do not slide over and do not frictionally engage any other part, and as is shown the end or ends 28 of the element 34 have stopping engagement with snubbers incorporated in the gland D. The element 34 is round in cross-section and like the chamber or chambers 10 the said element is reasonably smooth, but not necessarily so smooth as is ordinarily required when sliding fits are involved. The central arcuate axis of the element 34 remains coincidental with the toroidal axis $a$ at all times.

The bearing means C is provided so as to assure that the central arcuate axis of the ram B remains coincidental with the toroidal axis $a$ at all times, and involves a pivotal support for the ram B. Said pivotal support comprises a shaft 30 rotatable on axis r, bearings to carry the shaft in the body A, preferably spaced bearings 31 and 32, and the drive lever 33 joining the element 34 to the shaft 30. The lever 33 projects radially from the shaft 30, normally in the central plane of the chamber 15.

The gland D which characterizes this invention is provided to displace the element 34 from the chamber 10 and also to permit free movement of the element 34 in its function as a piston, and it is a partially deformable part made of pliant material and shaped so as to permit the application of fluid pressure and to permit free relative movement between the element 34 and chamber 10. The gland D is semi-toroidal in form as it extends along the axis a, being characterized by a deformable pliant wall 40 extending flexibly intermediate the outside diameter of the element 34 and inner diameter 26 of the chamber 10. As shown, the gland D is, therefore, tubular in cross-section and has an inner diameter portion 41 that is doubled back within an outer diameter portion 42, the said inner and outer portions being integrally joined by a curved portion 43. The two portions 41 and 42 are tubular and of substantial arcuate length. The inner diameter portion 41 is closed by an inner end wall 44, while the outer diameter portion 42 is closed by an outer end wall 45. The said walls 44 and 45 are imperforate walls that extend in diametric planes, to the end that the gland D becomes, essentially, a closed cell, this cell feature being characteristic of the invention. Thus, the outer diameter portion 42 of the cell-like gland D is confined within the configuration of chamber wall 26, while the inner diameter portion 41 is confined over the configuration of the element 34.

In accordance with the invention, the gland D is made of a material that is pliant so as to be flexible and a material that is not too elastic. Thus, the wall 40 can bend and roll from the element 34 to the chamber wall 26, as it doubles back as illustrated. The circumferential extent of the wall 40 can vary through means of elasticity in the pliant and elastic material, as said material bends and rolls between the inner and outer portions 41 and 42.

The transition of the wall 40 from portions 41 to 42 and through the curved portion 43 is semi-toroidal, said toroidal formation thus formed being truncated in a plane normal to the axis a. Thus, the pliant wall 40 is turned and/or bent between different diameters, with the wall 40 bearing tangentially onto the element 34 and onto the cylinder wall 26, all at said plane of truncation.

From the foregoing it will be clear that the element 34 moves without sliding friction, and that it is only the bearing means C and deflection of the pliant wall 40 that afford any resistance. As to the bearing means C, the said means is loaded extremely lightly and thereby can be designed for minimal friction. As to the deflection of the pliant wall 40, the fluid pressure is applied within said inner and outer portions and thereby inflates the cell-like gland D so that the portion 43 rolls substantially without friction from its inner disposition to its outer disposition and naturally forms a semi-toroid.

With the structure thus far described, and particularly with the seal or gland D, there is freedom of movement between the element 34 and chamber 10. There are no fluid connections to be made with the frame A or with the chamber 10, the gland D being integral with and continued in the stem 51 which conducts fluid to and from the gland D to inflate and to deflate the same.

In FIGS. 5-8 of the drawings I have shown a servo device that involves a chambered body A' in which the device is housed and supported, a part B' movable in the chamber of the body A' to be driven or to drive, bearing means C' to rotatably support the part B' in the body A', and a gland D' to operate against the part B' in the chamber of body A' and to permit free movement of said part. A double acting servo is shown and which is capable of substantially uniform operation without resort to cylindrical chambers, the chamber or chambers 10' in this second form being of rectangular cross-section. Also, the stroke or rotational requirements may be limited, as is shown, in which case substantially uniform operation is possible without resort to the element 34 above described. Thus, the frame A' is of simplified construction and the cell-like gland D' is without the above described inner portion 42.

The body A' can be fabricated in various ways and is shown, for example, as an extruded section cut into relatively short lengths having front and back faces 60 and 61 covered by closure plates 62 and 63. The movable element or lever 33' is in the nature of a movable partition operable to swing through the chamber or chambers 10'. The chambers 10' are arcuately disposed along an arcuate axis a, one chamber continuing into the other, and there is a lateral chamber 15' through which lever 33' swings. A composite of the two opposite chambers 10' and lateral chamber 15' establishes a triangular shaped or segmental opening through the body A' and which is readily closed by the plates 62 and 63 which are flat.

The part B' involves, essentially, the lever 33' which revolves on axis r and which acts as a movable partition that remains normally disposed to the axis a. In order to provide chambers 10' in the nature of cylinders and in order to avoid the relatively useless portion of lever 33' that extends through chamber 15', arcuate guide elements 34' separate the chamber 15' from the chambers 10'. The guide elements establish the inner arcuate wall 29', formed concentric with the outer arcuate wall 26'. Although the elements 34' can be fixedly positioned and slotted to pass the movable lever 33', it is preferred that the guide elements 34' be carried by the lever 33' to move therewith. Therefore, the body A' is provided with arcuate recesses that receive and accommodate the opposite movable ends of the elements 34' and predetermined cross-sectional area and fixed placement of the effective axis a is established when the gland D' operates therein.

The bearing means C' is essentially the same as the bearing means C above described. However, in this second form the bearing is advantageously formed in the body A', as by extrusion, so as to include travel limit means. As shown, the shaft 30' is captured in a bearing opening of more than 180°, there being circumferentially opposed stop faces 31' engageable with the lever 33' to limit movement thereof. The said stop faces 31' are at and/or adjacent the bearing opening.

The gland D' is essentially the same as gland D above described, being confined to act upon lever 33' by the guide elements 34', rather than by engagement of element 34 within the gland D. In the form of invention now under consideration the gland D' is cell-like and made of pliant and/or elastic material, the gland D' is captured within a closed chamber 10', and there is a displaceable part 33' movable within the chamber 10' to be moved by inflating and deflating the gland or glands D'. The gland D' has a stem 51' extending therefrom and through an opening in the body A', the gland being formed with rounded walls that fair one into the other. Further, the active end face of gland D' is initially concaved at 44' so as to roll outward onto the flat face of lever 33' when said gland is inflated.

With the rotary fluid displacement device as hereinabove disclosed a precise and direct correlation is obtained between fluid motion and mechanical motion. The said mechanical motion is rotary in that it involves the turning of a shaft and is substantially frictionless in that there are no sliding parts. Thus, the movement of fluid and displacement of mechanical parts is direct and positive, resulting in a particularly useful and practical servo or actuator of the type under consideration.

Having described typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A rotary fluid displacement device comprising:
   (a) a body having a fluid handling chamber in the form of a triangular segment with an outer wall curved about a rotational axis at one corner of said chamber,
   (b) a movable element rotatable in the body to swing concentric with said outer wall,
   (c) an arcuate guide extending through the chamber intermediate the said one corner and the said outer wall,
   (d) bearing means rotatably supporting the said element at said one corner of said chamber,
   (e) and a pliant fluid-tight gland confined in the chamber between the guide and said outer wall and engageable with the said movable element to displace the same by inflation.

2. A rotary fluid displacement device comprising:
   (a) a body having a fluid handling chamber in the form of a triangular segment with an outer wall curved about a rotational axis at one corner of said chamber,
   (b) a movable element rotatable in the body to swing concentric with said outer wall,
   (c) an arcuate guide carried by the movable element to move therewith and extend through the chamber intermediate the said one corner and the said outer wall,
   (d) bearing means rotatably supporting the said element at said one corner of said chamber,
   (e) and a pliant fluid-tight gland confined in the chamber between the guide and said outer wall and engageable with the said movable element to displace the same by inflation.

3. A double acting fluid displacement device comprising:
   (a) a body having opposite fluid handling chambers in the form of triangular segmental openings with outer walls curved about a common rotational axis at one corner of said opening,
   (b) a movable element rotatable in the body to swing concentric with said outer wall and displaceable between said two chambers,
   (c) an arcuate guide extending through the opening formed by said chambers, intermediate the said one corner and the said outer walls,
   (d) bearing means rotatably supporting the said element from the body on said rotational axis,
   (e) and a pair of pliant fluid-tight glands confined in the opposite chambers respectively and between the guide and said outer walls, and engageable with the opposite sides of the said movable element to displace the same by inflation.

4. A double acting fluid displacement device comprising:
   (a) a body having opposite fluid handling chambers in the form of triangular segmental openings with outer walls curved about a common rotational axis at one corner of said opening,
   (b) a movable element rotatable in the body to swing concentric with said outer wall and displaceable between said two chambers,
   (c) an arcuate guide carried by the movable element to move therewith and extend through the opening formed by said chambers, intermediate the said one corner and the said outer walls,
   (d) bearing means rotatably supporting the said element from the body on said rotational axis,
   (e) and a pair of pliant fluid-tight glands confined in the opposite chambers respectively and between the guide and said outer walls, and engageable with the opposite sides of the said movable element to displace the same by inflation.

5. A rotary fluid displacement device, comprising:
   (a) a body having a fluid handling chamber in the form of a triangular segment with an outer wall curved about a rotational axis at one corner of said chamber and with an arcuate recess opening into the chamber intermediate the said one corner and the said outer wall and formed concentric with said axis and said outer wall,
   (b) a movable element rotatable in the body to swing concentric with said outer wall,
   (c) an arcuate guide carried by the movable element to move therewith and to extend through the chamber from said arcuate recess,
   (d) bearing means rotatably supporting the said element at said one corner of said chamber,
   (e) and a pliant fluid-tight gland confined in the chamber between the guide and said outer wall and engageable with the said movable element to displace the same by inflation.

6. A double acting fluid displacement device, comprising:
   (a) a body having opposite fluid handling chambers in the form of triangular segmental openings with outer walls curved about a common rotational axis at one corner of said opening and there being an arcuate recess opening into each of said chambers intermediate the said one corner and the said outer walls and formed concentric with the said common rotational axis,
   (b) a movable element rotatable in the body to swing concentric with said outer wall and displaceable between said two chambers,
   (c) an arcuate guide carried by the movable element to move therewith and to extend through the chambers from said opposite recesses,
   (d) bearing means rotatably supporting the said element from the body on said rotational axis,
   (e) and a pair of pliant fluid-tight glands confined in the opposite chambers respectively and between the guide and said outer walls, and engageable with the opposite sides of said movable element to displace the same by inflation.

References Cited by the Examiner

UNITED STATES PATENTS

| 626,005 | 5/1899 | Fette | 92—120 |
| 3,051,143 | 8/1962 | Nee | 92—98 |
| 3,137,214 | 6/1964 | Feld et al. | 92—48 |

SAMUEL LEVINE, *Primary Examiner.*

RICHARD B. WILKINSON, *Examiner.*